United States Patent [19]

Peyton

[11] 4,399,695
[45] * Aug. 23, 1983

[54] UNDERWATER SENSING MECHANISM AND METHOD

[76] Inventor: Ralph B. Peyton, 18511-67th West, Lynnwood, Wash. 98036

[*] Notice: The portion of the term of this patent subsequent to Apr. 13, 1999 has been disclaimed.

[21] Appl. No.: 315,089

[22] Filed: Oct. 26, 1981

Related U.S. Application Data

[63] Continuation-in-part of Ser. No. 120,841, Feb. 12, 1980, Pat. No. 4,324,135, which is a continuation-in-part of Ser. No. 28,004, Apr. 9, 1979, abandoned.

[51] Int. Cl.$^3$ ............................................. G01C 21/10
[52] U.S. Cl. ........................................ 73/185; 73/187; 340/852
[58] Field of Search .................... 73/185, 184, 187; 367/134, 174, 175; 340/856, 857, 852

[56] References Cited

U.S. PATENT DOCUMENTS

| | | | |
|---|---|---|---|
| 3,038,143 | 6/1962 | Dow | 367/134 |
| 3,566,345 | 2/1971 | De Souza Large et al. | 73/301 |
| 3,706,224 | 11/1972 | Overs | 73/187 |
| 4,159,644 | 7/1979 | Svals | 73/187 |
| 4,315,326 | 2/1982 | Chase | 73/178 R |

*Primary Examiner*—Donald O. Woodiel
*Attorney, Agent, or Firm*—Ward Brown; Robert W. Beach

[57] ABSTRACT

A water speed sensing transmitter unit suspended from a fishing boat at the depth fishing gear is being trolled actuates transmission of a pulse signal through the water for detection by a receiver unit mounted on the boat. The frequency of the pulse signal is proportional to the speed of the transmitter unit relative to surrounding water at the trolling depth. The receiver unit recreates a corresponding pulse signal, averages it and triggers a display of the average speed sensed by the transmitter unit over a predetermined period.

25 Claims, 14 Drawing Figures

U.S. Patent    Aug. 23, 1983    Sheet 1 of 5    4,399,695
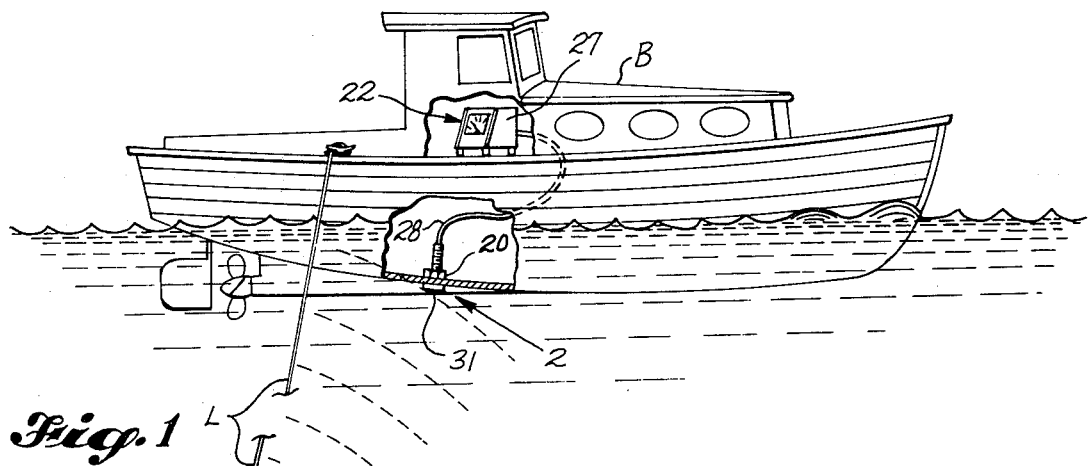
Fig. 1
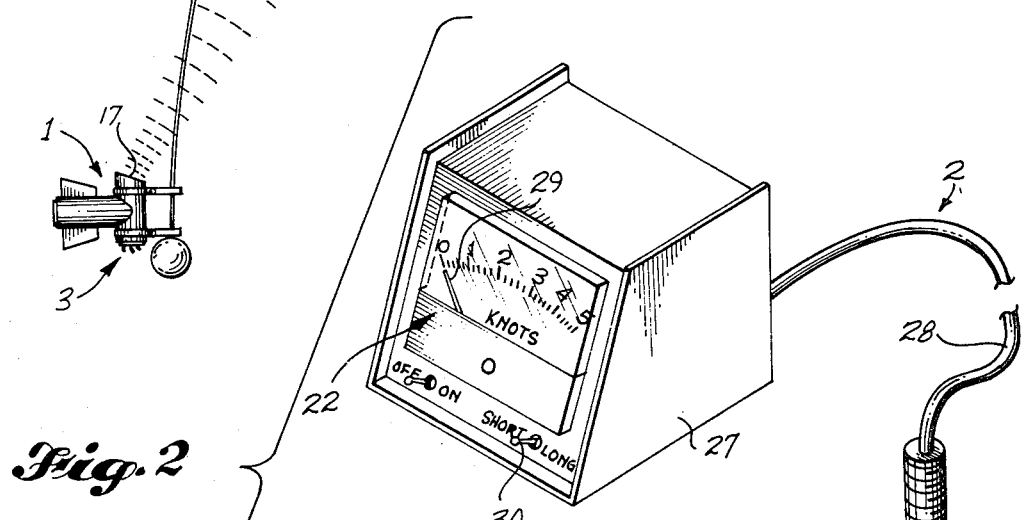
Fig. 2
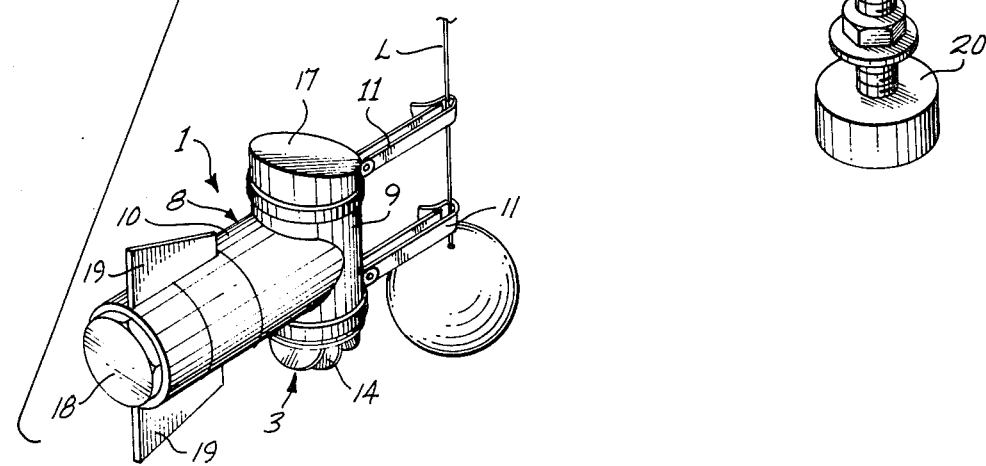

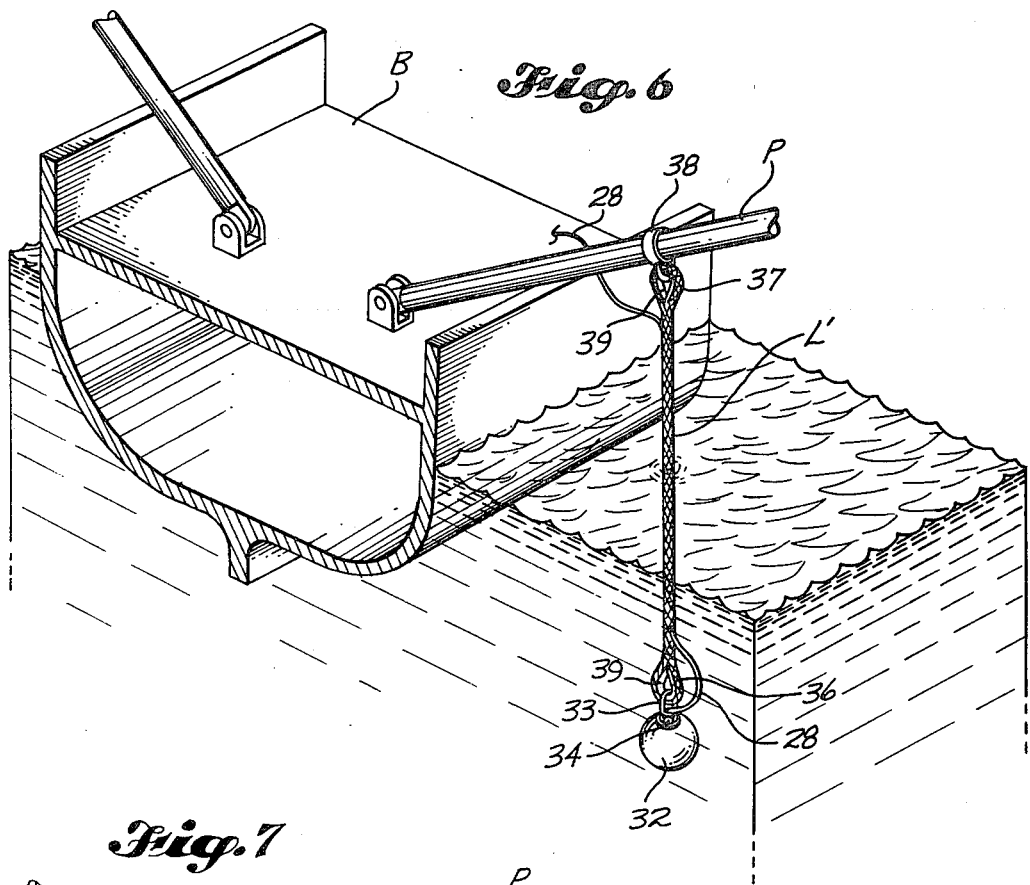
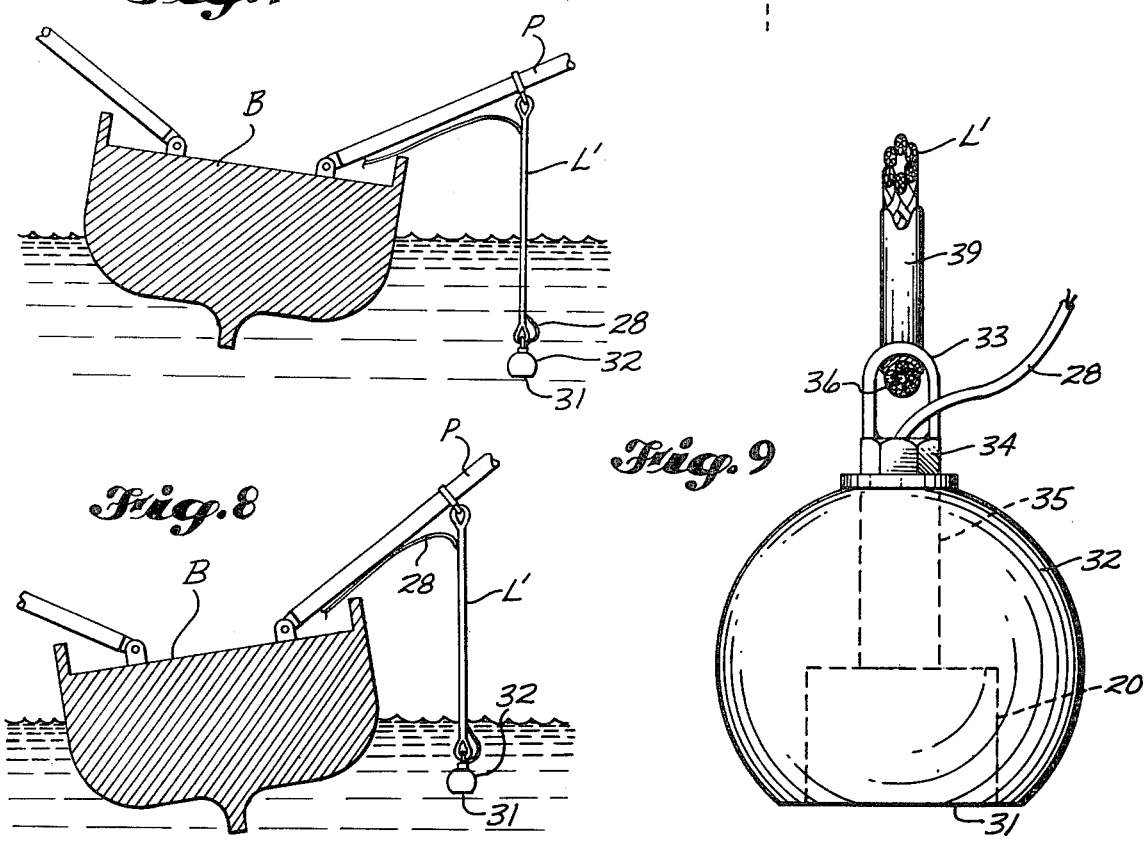

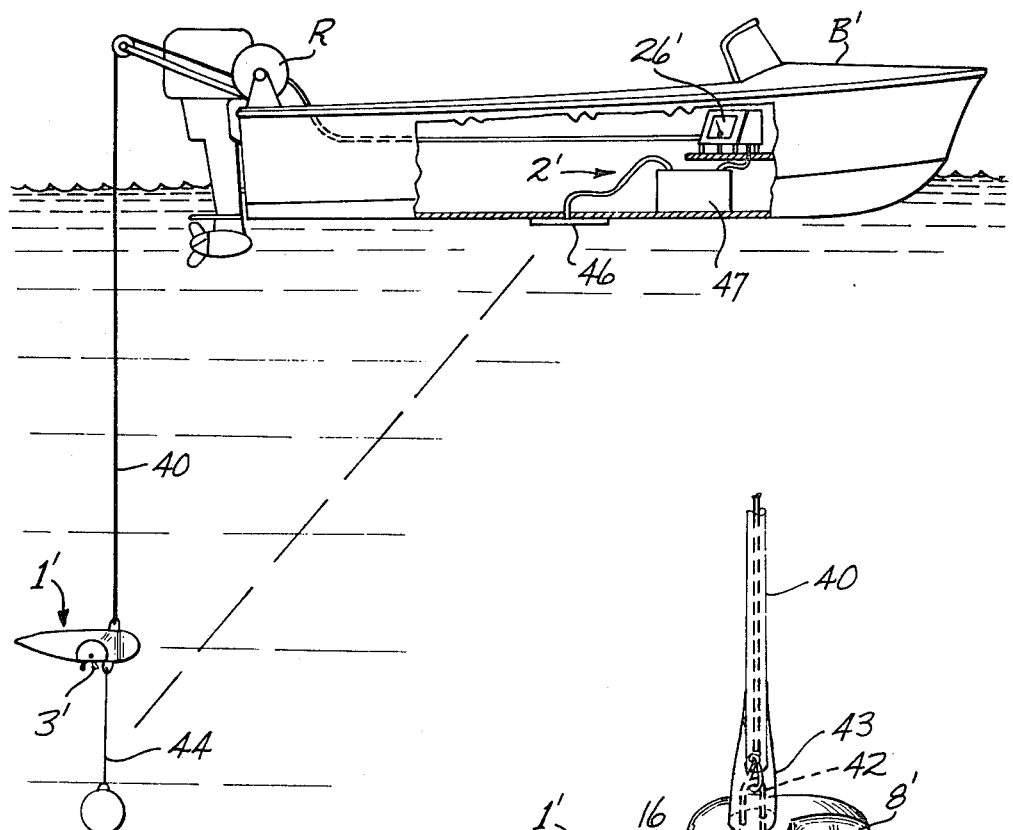
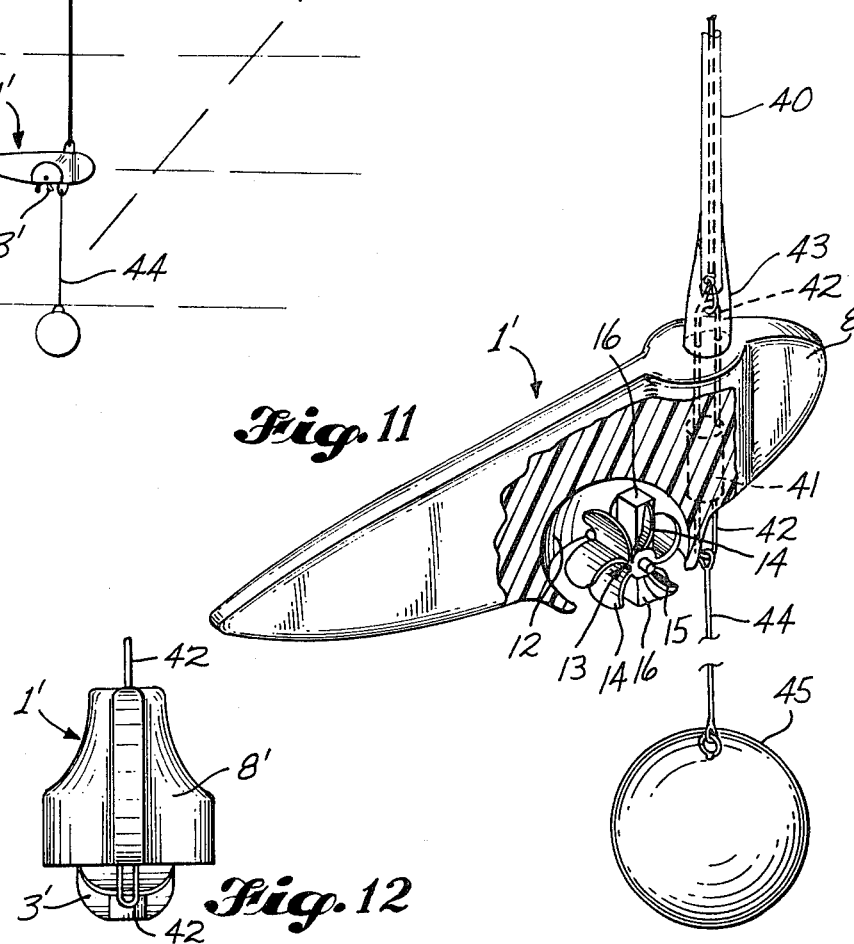

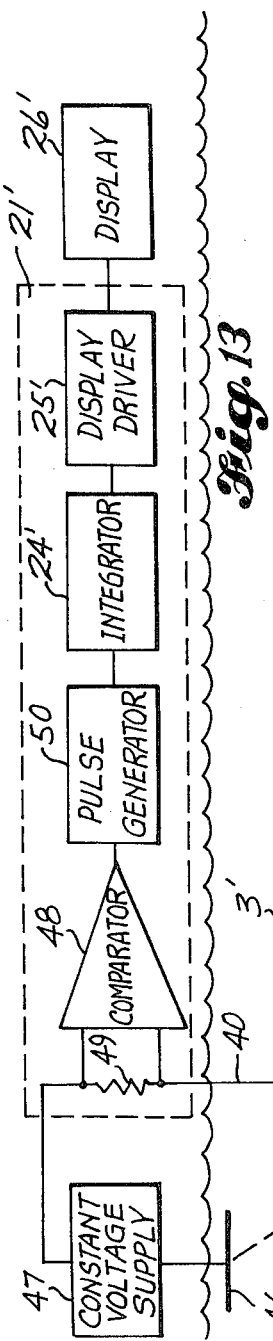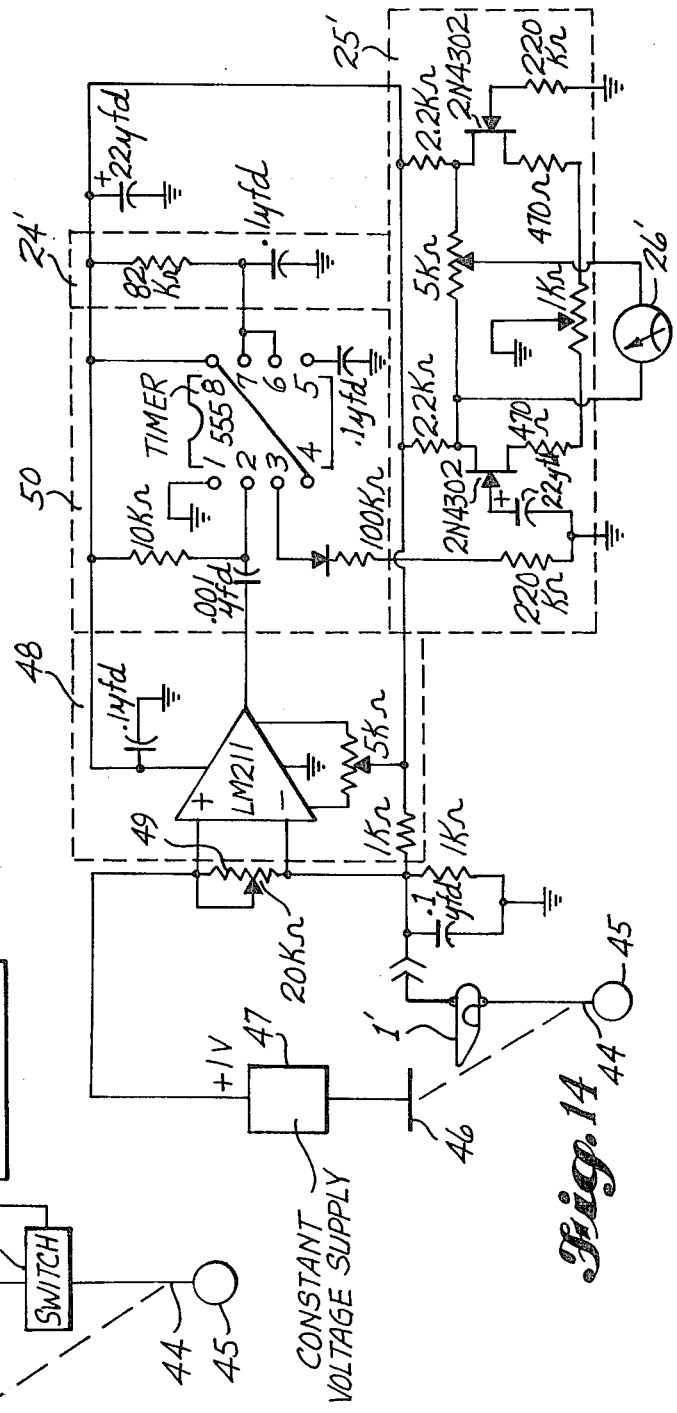
Fig. 13
Fig. 14

UNDERWATER SENSING MECHANISM AND METHOD

CROSS REFERENCE

This application is a continuation-in-part of my copending application Ser. No. 120,841, filed Feb. 12, 1980, now U.S. Pat. No. 4,324,135, which was a continuation-in-part of my application Ser. No. 028,004, filed Apr. 9, 1979, now abandoned.

BACKGROUND OF THE INVENTION

1. Field of the Invention

The present invention relates to a method of and mechanism for indicating the speed of fishing gear trolled by a fishing boat relative to surrounding water at the trolling depth.

2. Prior Art

It is known that the fish-attracting effectiveness of bait, either natural bait or artificial lures, trolled through water varies greatly with the "trolling speed", that is, the speed of the bait relative to surrounding water at the trolling depth. If the bait is trolled too fast or too slow, the "action" of the bait is incorrect for optimum attraction of fish. The optimum range of trolling speeds varies with the bait being used and also with the species of fish to be attracted. For some species, such as Chinook salmon, few fish are attracted if the trolling speed is outside of a very narrow range.

Up to now, determination of the actual trolling speed at the trolling depth has been largely a matter of guesswork. Some fishermen rely entirely on the speeds of their fishing boats relative to surface water in their attempts to set the actual trolling speed at an optimum rate. Others attempt to gauge trolling speed by the angles of their weighted fishing lines, or the tag lines to which their fishing lines are attached, relative to their fishing boats, taking into consideration the amount of weight being used to maintain the bait at a desired depth. Others merely vary boat speed until a fish is caught and then either try to maintain about the same boat speed or continue varying boat speed.

Experienced fishermen recognize that actual trolling speed is affected by surface currents, subsurface currents, tidal action, wave action and wind, and that, consequently, boat speed or fishing line angle are poor indicators of actual trolling speed. Such experienced fisherman usually try to maintain about the same boat speed or fishing line angle that previously has produced good results in the same location under similar conditions, or totally ignore boat speed and fishing line angle and instead rely on their "feel" of the action of the bait or lures.

Maintaining correct trolling speed is particularly important when bait is trolled deep and/or slowly. For example, for Chinook salmon fishing bait is trolled at various depths up to 90 fathoms and the difference between water speed on the surface and at any depth below even 5 or 10 fathoms often is large. In addition, some lures for Chinook salmon fishing are designed to be trolled between a minimum and maximum speed separated by about 0.3 or 0.5 knot, usually within the range of 1.5 knots to 4.0 knots. Such accuracy is impossible to maintain at such slow trolling speeds if the skipper does not know the actual water conditions at the trolling depth.

EXPLANATORY MATERIAL

*McGraw-Hill Encyclopedia of Science and Technology,* 3rd Edition (1971), contains discussions of the following subjects at the volumes and pages indicated:

"Underwater Sound", Vol, 14, pp. 218–222;
"Underwater Telephone", Vol. 14, p. 222;
"Transducer, Underwater", Vol. 14, pp. 26–27;
"Clipping Circuit", Vol. 3, pp. 215–216;
"Integrating Detector", Vol. 5, p. 559
"Smoothing (averaging, integrating) filter", Vol. 5, p. 290.

SUMMARY OF THE INVENTION

The principal object of the present invention is to provide mechanism and a method for indicating at a remote location a numerical value representing a condition existing at an underwater location.

More specific objects are to provide a method of accurately and precisely measuring and indicating the speed of fishing gear being trolled by a fishing boat relative to surrounding water at the trolling depth and to practice such method with mechanism which is of simple, compact and inexpensive design, easy to use and store, and reliable for a wide range of weather and water conditions.

In the preferred embodiments of the invention, the foregoing objects are accomplished by positioning a water speed sensor at the trolling depth for detecting the speed of such sensor relative to surrounding water, generating a signal of such relative speed and effecting transmission of such signal through the water, receiving such transmitted signal at the boat and using such received signal to trigger a display of such relative speed.

Mechanism for practicing the above method includes: a transmitter unit disposable under water and including the water speed sensor and the signal-generating mechanism, and a receiver unit mountable on or located adjacent to the fishing boat and including the signal-receiving mechanism and a signal-responsive display.

BRIEF DESCRIPTION OF THE DRAWINGS

FIG. 1 is a somewhat diagrammatic side elevation of a speed indicator for fishing gear in accordance with the present invention as used on a fishing boat, parts being broken away.

FIG. 2 is an enlarged top perspective of the transmitter unit and receiver unit constituting the indicator of FIG. 1.

FIG. 6 is a diagrammatic fragmentary top perspective of the signal receiving mechanism of the receiver unit of the indicator of FIG. 1 showing the preferred mounting of such mechanism on a fishing boat, FIGS. 7 and 8 are corresponding diagrammatic end elevations showing such mounting with the boat in different positions and FIG. 9 is an enlarged fragmentary side elevation of the signal receiving mechanism mounting shown in FIGS. 6, 7 and 8.

FIG. 10 is a somewhat diagrammatic side elevation of a second embodiment of speed indicator for fishing gear in accordance with the present invention, including a transmitter unit and a receiver unit, parts being broken away.

FIG. 11 is a fragmentary top perspective of the transmitter unit of the indicator of FIG. 10 with parts broken away, and FIG. 12 is a fragmentary front elevation of such transmitter unit.

FIG. 13 is a block circuit diagram of the indicator of FIG. 10, and

FIG. 14 is a circuit diagram of the indicator of FIG. 10 showing the receiver unit in greater detail.

DETAILED DESCRIPTION OF THE PREFERRED EMBODIMENTS

As shown in FIG. 1. a speed indicator for fishing gear in accordance with the present invention includes a remote transmitter unit 1 trailed under water at the depth the fishing gear is being trolled, such as by attachment to a weighted line L hanging from the fishing boat B trolling the gear; and a receiver unit 2 carried by the boat. In general, transmitter unit 1 effects transmission of a signal through the water corresponding to the speed of the transmitter unit relative to surround water at the trolling depth using the water as the signal-conducting medium, and receiver unit 2 receives such signal and generates a display of such speed. Consequently, the operator of the fishing boat always knows the actual trolling speed of the fishing gear, that is, the absolute speed of the gear relative to surrounding water at the trolling depth irrespective of the influence on such speed of the action of tides and currents at such depth.

Figure 3:
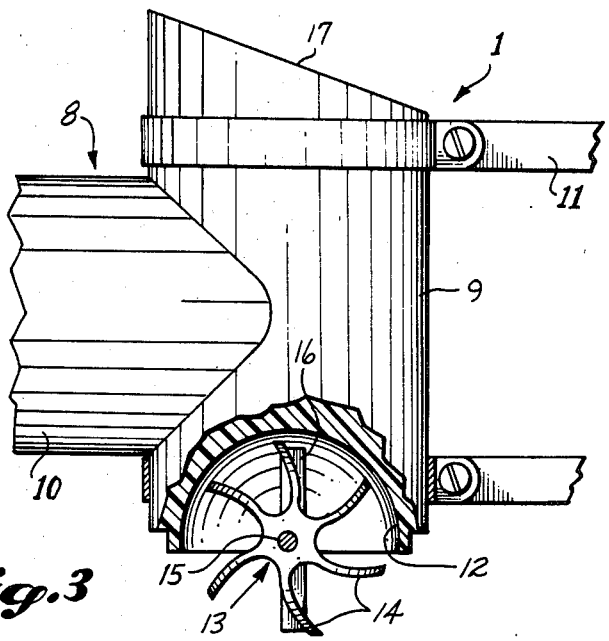
FIG. 3 is a further enlarged fragmentary side elevation of the transmitter unit of the indicator of FIG. 1 with parts broken away.
Figure 4:
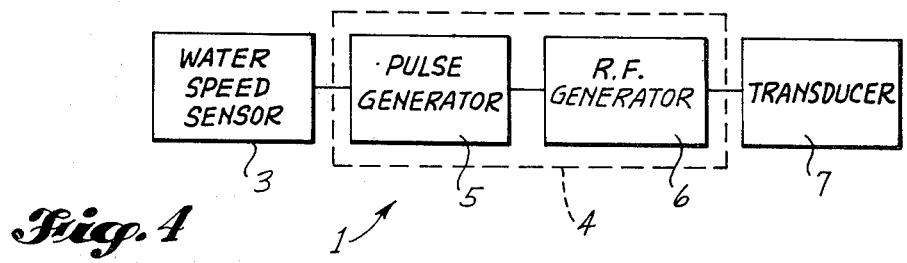
FIG. 4 is a block circuit diagram of the transmitter unit of the indicator of FIG. 1.

As illustrated in FIG. 4, the transmitter unit 1 includes a water speed sensor 3 which may be any type of water speed sensor but preferably is a rotatable mechanical water speed responsive device such as a paddle wheel or propeller shown in FIG. 3. Electrical mechanism 4, indicated diagrammatically in FIG. 4, generates a first electrical signal corresponding to the relative speed detected by the water speed sensor. In one embodiment, such electrical mechanism includes a pulse generator 5 producing electrical pulses at a repetition rate or frequency controlled by the speed of the mechanical water speed sensor and a pulsed oscillator, which preferably is a radio-frequency generator 6, driven recurrently by the pulses. Signal-transmitting mechanism 7, namely an underwater transducer acting as a projector, converts the first electrical signal to a corresponding underwater sonic signal.

The preferred transmitter unit shown in FIGS. 2 and 3 includes a watertight housing 8 having a cylindrical front portion 9 arranged with its axis extending vertically and a cylindrical tail portion 10 arranged with its axis extending horizontally and projecting rearward from about the elevational center of the front portion 9. Two elevationally spaced attachment clips 11 for releasably attaching the transmitter unit to line L project forward from housing portion 9.

As shown in FIG. 3, the vertically-extending front housing portion 9 has a hemispherically concave recess 12 opening at the bottom of such housing portion. A small paddle wheel 13 having generally radially projecting blades 14 is mounted on a shaft 15 for rotation. The axis of that shaft extends transversely of the transmitter unit. The opposite shaft end portions are received in opposite sides of housing recess 12. The periphery of each blade is generally circular so that the blades are shaped complementally to the housing recess. Two of the blades 14 projecting substantially directly opposite each other from shaft 15 carry permanent bar magnets 16 for conjoint rotation with such blades.

The lower blades of the paddle wheel project out of the housing recess 12 in the path of water flowing past the transmitter unit as it is trolled, whereas the upper blades 14 are closely received in the recess. The tip portion of each blade 14 is curved so that such tip projects forward toward oncoming water when the blade is in its lower position. The lower blades of the paddle wheel catch water flowing past the transmitter unit, effecting rotation of the paddle wheel at a speed controlled by the speed of movement of the transmitter unit relative to surrounding water.

Other than the magnets 16 rotated with the paddle wheel, all of the electrical mechanism 4 for generating the first electrical signal of the speed detected by the paddle wheel is sealed inside the core of the hollow front housing portion 9. In one embodiment of the invention, the pulse generator 5 includes a magnet-actuated element closely adjacent to recess 12 for detecting movement of a magnet 16 past such element and triggering generation of an electrical pulse. For example, the magnet-actuated element can be a magnetically actuated proximity switch connected to a battery. Each time a magnet moves past the switch, the switch closes for an instant, connecting the battery to the circuit and thereby generating a short pulse having an amplitude equal to the battery voltage. Consequently, the pulse repetition frequency is directly proportional to the speed of rotation of the paddle wheel which, in turn, corresponds to the speed of movement of the transmitter unit relative to surrounding water.

The pulses generated by the pulse generator 5 drive the ratio-frequency generator 6, which acts as a pulsed oscillator in that it provides no output except while driven by a pulse from the pulse generator. The output of the radio-frequency generator is a series of short, substantially uniform radio-frequency pulses, that is, "bursts" of radio-frequency energy, the repetition rate or frequency of the radio-frequency pulses or bursts being the same as the repetition frequency of the pulses from the pulse generator. The duration of each radio-frequency burst can be about $\frac{1}{2}$ millisecond.

The output of the radio-frequency generator drives the underwater transducer 7 to effect transmission of a corresponding sonic signal through the water. The vibrating diaphragm 17 of the transducer is located at the top of housing portion 9 and is angled upward and forward for directing the sonic signal toward the fishing vessel.

The power supply, such as a battery or batteries, for the pulse generator, radio-frequency generator and transducer is carried in the housing tail portion 10. The rear end of the tail portion has a watertight cap 18 which is removable for access to the power supply. Fins 19 projecting vertically upward and downward from the tail portion, substantially perpendicular to the axis of the paddle wheel shaft 15, provide directional stability for the speed sensor, deter oscillation or vibration of the transmitter unit as it is trolled through the water and ensure that the broad faces of the downward projecting paddle wheel blades are presented to oncoming water.

Figure 5:
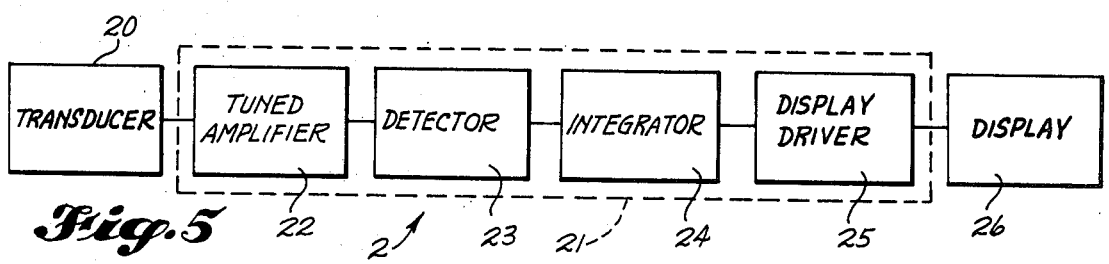
FIG. 5 is a block circuit diagram of the receiver unit of the indicator of FIG. 1.

As illustrated in FIG. 5, the receiver unit 2 includes signal-receiving mechanism 20, namely an underwater transducer acting as a hydrophone, which converts the sonic signal transmitted by the transmitter unit 1 to a second electrical signal having characteristics corresponding to the relative speed detected by the water speed sensor, identical or nearly identical to the first electrical signal generated by electrical mechanism 4. Accordingly, the output of the underwater transducer 20 is a series of radio-frequency pulses or bursts having a repetition frequency equal to the repetition frequency of the pulse signal generated by the pulse generator 5. Electrical mechanism 21, in the nature of an average or integrating detector, demodulates such second electrical signal and actuates a display 26 indicating such relative speed.

In the preferred embodiment, electrical mechanism 21 includes an amplifier 22 tuned to the carrier frequency, that is, the frequency of the radio-frequency energy generated by the radio-frequency generator 6. The output of amplifier 22, still a series of spaced, substantially uniform, widely spaced bursts of radio-frequency energy, is fed to a detector 23 for converting the radio-frequency bursts back to a pulse signal, that is, a series of constant amplitude, substantially uniform pulses corresponding to the pulse signal generated by the pulse generator 5. For example, the detector can include a half-wave rectifier, or a clipping amplifier acting as a half-wave rectifier, so that the positive or negative voltage portion of each amplified radio-frequency burst is clipped; and a monostable (one-shot) multivibrator triggered by the output of the rectifier to generate a single constant amplitude pulse for each rectified radio-frequency burst. Each pulse generated by the multivibrator has the same duration, preferably at least several milliseconds. The pulse repetition frequency of the uniform pulses generated by the multivibrator is the same as the pulse repetition frequency of the radio-frequency bursts generated by the radio-frequency generator 6, which is the same as the pulse repetition frequency of the pulses generated by the pulse generator 5, which corresponds to the speed of rotation of the paddle wheel 13.

The output of detector 23 is fed to an averaging circuit or integrator 24, which can be a simple resistor-capacitor averaging or integrating filter. The time constant or averaging period of the integrator is long enough to encompass several pulses and, consequently, the voltage of the output of the integrator is substantially directly proportional to the pulse repetition frequency of the pulse signal from the detector 23. For example, for a high frequency detector pulse output, corresponding to fast movement of the transmitter unit 1 relative to surrounding water, a greater number of pulses will occur during the averaging period than for a lower frequency detector pulse output, corresponding to slower movement of the transmitter unit relative to surrounding water. The result is that the output voltage of the integrator is a signal of the average speed of the transmitter unit relative to surrounding water in that such output voltage is proportionately higher for a high pulse repetition frequency, that is, for fast movement of the transmitter unit, than for a lower pulse repetition frequency, that is, for proportionately slower movement of the transmitter unit.

The signal of average speed from the integrator is fed to a display driver 25, such as an amplifier, which triggers the voltage responsive display 26 to indicate the speed of the transmitter unit relative to surrounding water at the trolling depth. Such display can be an electronic digital display or, as shown in the drawings, can have a mechanical indicator, such as a swinging needle 29. In either case, the display acts as a voltmeter showing the speed of movement of the transmitter unit that corresponds to the amplified voltage output of the display driver 25.

Averaging the relative speed detected by the water speed sensor over a period of substantial length reduces hunting of the speed-indicating needle or digital readout inaccuracies resulting from abrupt changes in the relative speed of the transmitter unit, which may be caused by irregular currents, wave action or gusts of wind. Preferably the length of the predetermined averaging period is adjustable by the operator of the fishing vessel. A short averaging period is selected for calm conditions so that a substantially instantaneous reading of actual trolling speed is obtained, whereas in violent or irregular conditions a smooth, generally uniform reading still is obtained by increasing the averaging period.

A switch 30 on the display unit can be provided for the averaging circuit or integrator 24 to control the length of the averaging period. For example, for one setting of the switch, the "short" setting, the averaging period is about six seconds, whereas for another setting of the switch, the "long" setting, the averaging period is about fifteen seconds. Where the integrator is a simple resistor-capacitor averaging filter, manipulation of the switch can simply connect one or the other of two resistors or capacitors to the other filter component to set the time constant at an appropriate value. Alternatively, an infinitely variable switch mechanism could be provided for setting the averaging period to be any duration between, for example, three seconds and sixty seconds, such as by use of a potentiometer in a simple resistor-capacitor averaging filter.

As shown in FIGS. 1 and 2, the underwater transducer 20 of the receiver unit can be mounted beneath the boat hull with its receiving diaphragm 31 angled downward and rearward toward the oncoming sonic signal transmitted by the transmitter unit. Electrical mechanism 21 can be mounted in the housing 27 for the display 22 and connected to the transducer by an electrical cable 28. However, mounting the receiver transducer 20 stationarily relative to the boat results in the receiving diaphragm 31 rocking and pitching with the boat, changing the angle of such diaphragm relative to the sonic signal transmitted by the diaphragm 17 of the transmitter transducer. Since most underwater transducers are at least somewhat direction sensitive, the alternative mounting of the receiver transducer to the boat shown in FIGS. 6 through 9 is preferred.

In the preferred mounting of the receiver transducer 20 on a fishing boat B shown in FIGS. 6 through 9, such transducer is carried inside of weight 32, such as a twelve pound (5.4 kilogram) lead ball, with its receiving diaphragm 31 exposed at the bottom of the weight. The upward projecting loop 33 of a bail 34 that is carried by the weight, such as by being screwed onto the threaded upward projecting transducer shaft 35, is received in the lower end loop 36 of a line L' having its upper end loop 37 connected to a pole P by a bracket 38. Such pole can be a trolling pole projecting outward from a side of the boat. The inner peripheries of end loops 36 and 37 are reinforced by metal straps 39. Preferably line L' is a hollow braided line so that the transmission cable 28 extending from the transducer to the display unit can be threaded loosely through substantially the full length of the line as shown in FIG. 6.

As shown diagrammatically in FIGS. 8 and 9, as the fishing boat rocks or pitches, line L' carrying the weight 32 and the receiving transducer 20 moves up and down and slightly toward and away from the adjacent side of the hull of the fishing boat, but remains substantially vertical. Consequently, the receiving diaphragm 31 of the transducer always is pointed substantially directly downward, that is, at a substantially constant angle to the sonic signal from the transmitter unit.

Preferably line L' is carried by pole P a sufficient distance outward from the side of the hull of the fishing boat that the weight 32 carrying the receiver transducer will not bounce against such hull side as the boat rocks. In addition, the length of line L' should be sufficient that the signal-receiving diaphragm 31 of the receiver transducer always is located a substantial distance under water. In a representative installation, line L' is connected to pole P about 3 to 6 feet (0.9 meters to 1.8 meters) outward from the adjacent side of the boat hull and the length of line L' is sufficient that, at rest, the transducer signal-receiving diaphragm is positioned at least about 3 feet (0.9 meters) under water.

The display of the receiver unit can be permanently mounted on the fishing boat. When not in use, the compact transmitter unit can be stowed in any convenient location. The speed indicator can be put into use quickly and easily by clipping the transmitter unit to a line hanging from the fishing vessel, lowering the line to position the transmitter unit at the trolling depth and lowering the receiver transducer if it is not permanently mounted in the hull.

The embodiment of the present invention shown in FIG. 10 includes a transmitter unit 1' trailed underwater at the depth fishing gear is being trolled by a boat B', by attachment to a wire 40 hanging from the boat. In general, the transmitter unit generates an electrical signal corresponding to the speed of the transmitter unit relative to surrounding water at the trolling depth, and the electrical signal is transmitted through the water using the water as the conducting medium. A receiver unit 2' mounted on the boat detects the transmitted signal and generates a display of such speed.

The water speed sensor 3' of the transmitter unit 1' is substantially the same as the water speed sensor of the previously described embodiment. As seen in FIGS. 11 and 12, a small paddle wheel 13 is mounted on a shaft 15 and has generally radially projecting blades 14. The opposite shaft end portions are received in the opposite lateral sides of the generally hemispherically concave recess 12 opening at the bottom of the plastic, watertight housing 8' carrying the water speed sensor. The periphery of each blade is generally circular so that the blades are shaped complementally to the housing recess; two of the blades projecting substantially directly opposite each other from shaft 15 carry permanent bar magnets 16 for conjoint rotation with such blades; the lower blades of the paddle wheel project out of the housing recess 12 in the path of water flowing past the transmitter unit as it is trolled; and the tip portion of each blade 14 is curved so that such tip projects forward toward oncoming water when the blade is in its lower position.

The housing 8' is elongated fore and aft like a streamlined fin so as to remain substantially parallel to the direction of movement of the transmitter unit relative to surrounding water. Consequently, the broad faces of the downward projecting paddle wheel blades always are presented to oncoming water and the paddle wheel rotates at a speed controlled by the speed of movement of the transmitter unit relative to surrounding water.

A magnetically-actuated proximity switch 41 is encased in the forward end portion of the housing 8' closely adjacent to the housing recess 12. Such switch connects two electrically-conductive bails 42 projecting, respectively, upward and downward from the switch. As best seen in FIG. 11, wire 40 by which the transmitter unit is suspended is an insulated wire, the inner conductor of which is connected to the upward-projecting bail. A coating 43 of plastic or other nonconductive material insulates the upper bail and the wire conductor from surrounding water.

The upper end of a bare, electrically-conductive wire or cable 44 is attached to the downward projecting bail; and, preferably, the lower end of such bare wire carries a weight 45 for maintaining the bare wire hanging downward from the transmitter unit. When the switch 41 is closed, which occurs each time one of the paddle wheel magnets 16 passes the switch, an electrical connection is made between the upper insulated wire through the upper bail and the switch, to the downward projecting bail and the bare wire hanging from the lower bail. Since the paddle wheel magnets rotate at a speed proportional to the speed of the transmitter unit relative to surrounding water, the switch closes and the electrical connection is made at a frequency proportional to such speed.

The bare wire 44 hanging from the transmitter unit acts as one electrode, preferably the anode, in the speed indicator, and another electrode 46 of electrically conductive material can be mounted on the boat hull as indicated in FIG. 10. A constant voltage supply 47, including, for example, a battery, connects the two electrodes through the insulated wire 40. The current-conducting loop is completed by the water between the two electrodes, so that current flows each time the switch is closed. The result is that current pulses through the loop at a frequency proportional to the speed of the transmitter unit relative to surrounding water.

The receiver unit 2' shown in FIGS. 13 and 14 includes electrical mechanism 21' for detecting the pulsing of the current and actuating a display 26' at the boat to show the relative speed of the transmitter unit. In the preferred embodiment, the detecting portion of the transmitter unit is in the form of a comparator 48, the input leads of which are connected at opposite sides of a resistor 49 in series with the two electrodes 44 and 46. The comparator provides a constant amplitude output when it detects a difference in the voltages supplied to its two input leads, which will occur whenever occurs flows between the electrodes.

The pulses from the comparator serve as the input for a pulse-generating circuit 50 which can be a monostable multivibrator. Each pulse generated by the multivibrator has the same duration, preferably at least several milliseconds. The pulse repetition frequency of the pulse output of the multivibrator is the same as the pulse repetition frequency of the pulse output of the comparator, which is the same as the frequency of the opening and closing of the switch 41, which corresponds to the speed of rotation of the paddle wheel 13.

The output of the pulse generator 50 is fed to an averaging circuit or integrator 24' which, as indicated in FIG. 14, can be a simple resistor-capacitor averaging or integrating filter. As in the previously described embodiment, the time constant or averaging period of the integrator preferably is long enough to encompass several pulses and, consequently, the voltage of the output of the integrator is substantially directly proportional to the pulse repetition frequency of the pulse signal from the pulse generator 50. As in the previously described embodiment, the output of the integrator is amplified by a display driver 25' for triggering a voltmeter type display 26' which can be an electronic digital display or, as shown in the drawings, have a mechanical indicator such as a swinging needle.

With the circuit shown in FIG. 14, the indicator has been found to function as intended for depths up to about 90 feet (27.4 m) in sea water. For fresh water or deeper applications, greater power and/or an adjustment in the value of resistor 49 may be required.

An added benefit of the embodiment of FIGS. 10 through 14 is the attraction of fish to the bare wire electrode 44 which, preferably, is in the area of the fish-catching lures or bait. Such lures or bait can be carried by a line or lines connected to the aft end of the transmitter unit housing 8' or to the insulated wire 40 above the housing. For easy use and storage, the insulated wire can be held on a large reel R on the boat, such as a conventional downrigger, as indicated in FIG. 10.

I claim:

1. A process for measuring the trolling speed of fishing gear being trolled by a fishing boat, which comprises positioning a water speed sensor at approximately the trolling depth for detecting the speed of such sensor relative to surrounding water, generating a first electrical signal of the speed detected by the water speed sensor, conducting the first electrical signal to an electrode at approximately the trolling depth, effecting transmission of such first electrical signal through the water to another electrode adjacent to the boat using the water as the signal-conducting medium, receiving such transmitted signal at the boat, and actuating a display of such speed at the boat.

2. The process defined in claim 1, including actuating a display of the average speed detected by the water speed sensor over a predetermined period.

3. The process defined in claim 1, including positioning at approximately the trolling depth a remote transmitter unit having the water speed sensor, such transmitter unit including a housing and the water speed sensor being movable relative to the housing at a speed controlled by the speed of the transmitter unit relative to surrounding water, and generating the first electrical signal of such speed of the transmitter unit by generating electrical pulses at a repetition frequency substantially proportional to the speed of the water speed sensor relative to the housing.

4. The process defined in claim 1, including actuating opening and closing of a switch in series with the two electrodes at a rate approximately proportional to the speed of the water speed sensor relative to surrounding water, and supplying electrical power to the switch in a loop including the two electrodes and the water between the two electrodes so that electrical current pulses through the loop at a frequency approximately proportional to the speed of the water speed sensor relative to surrounding water.

5. The process defined in claim 4, including detecting the pulses of current through the loop, and generating a second signal of pulses of substantially uniform duration and voltage amplitude but at a repetition frequency approximately proportional to the frequency of the first electrical signal.

6. The process defined in claim 4 or 5, including detecting current flow through the loop by comparing the voltages at opposite sides of a resistor in the loop.

7. A speed indicator for fishing gear trolled by a fishing boat, comprising:
a transmitter unit disposable under water and having means for sensing the speed of said transmitter unit relative to surrounding water, means for generating an electrical signal of the speed sensed by the sensing means and means for effecting transmission of said electrical signal through the water using the water as the signal-conducting medium including a first electrode positioned at approximately the trolling depth; and
a receiver unit mountable on the fishing boat and having means for receiving said transmitted signal including a second electrode adjacent to the boat for receiving said transmitted electrical signal and display means responsive to said signal for displaying such speed.

8. The indicator defined in claim 7, in which the electrical signal-generating means includes means for generating an electrical pulse signal having a pulse repetition frequency substantially proportional to the speed sensed by the sensing means.

9. The indicator defined in claim 8, in which the sensing means includes a mechanical water speed sensor rotatable at a speed corresponding to the speed of movement of the transmitter unit relative to water surrounding it and the electrical signal-generating means includes means for generating electrical pulses at a pulse repetition frequency substantially proportional to the speed of rotation of the mechanical water speed sensor.

10. The indicator defined in claim 7, in which the receiver unit includes averaging means for actuating the display means to display the approximate average speed of movement of the transmitter unit relative to surrounding water over a predetermined period.

11. The indicator defined in claim 7, in which the transmitter unit includes a housing, the sensing means includes a member movable relative to said housing by relative movement of said housing and the surrounding water, and the electrical signal-generating means includes first and second magnetic members carried, respectively, by said movable member and said housing.

12. The indicator defined in claim 11, in which the movable member is movable relative to the housing at a speed controlled by the speed of the transmitter unit relative to surrounding water, the first magnetic member is movable repetitively past the second magnetic member by movement of the movable member relative to the housing, and the electrical signal-generating means includes means for generating an electrical pulse each time the first magnetic member moves past the second magnetic member.

13. The indicator defined in claim 7, in which the transmitter unit includes a housing and the sensing means includes a paddle wheel rotatively mounted on the housing.

14. The indicator defined in claim 7, including an insulated wire suspending the sensing means from the boat.

15. The indicator defined in claim 7 or 14, in which the first electrode is a bare wire hanging from the transmitter unit.

16. A speed indicator for fishing gear trolled by a fishing boat comprising:

a first electrode disposed under water at approximately the depth the fishing gear is being trolled;
a second electrode adjacent to the boat;
an electrical power source;
a switch;
an electrical conductive wire connecting said first electrode, said second electrode, said electrical power source and said switch in series such that said wire in combination with water between said first and second electrodes forms an electrical conductive loop;
means for sensing the speed of said first electrode relative to surrounding water;
means for actuating opening and closing of said switch at a rate proportional to the speed sensed by said sensing means so that current pulses through said loop at a frequency proportional to the speed sensed by said sensing means;
means for detecting current flow through said loop; and
display means responsive to said detecting means for displaying the approximate speed sensed by said sensing means.

17. The speed indicator defined in claim 16, in which the detecting means include a resistor in the loop in series with the two electrodes and comparator means for detecting a difference in the voltages at opposite sides of said resistor when current flows through the loop.

18. A process for indicating at a remote location a numerical value representing a condition existing at an underwater location, which comprises positioning at the underwater location mechanism for sensing the condition, generating a first electrical pulse signal having a pulse repetition frequency substantially proportional to the numerical value representing the condition sensed by the sensing mechanism, conducting the first electrical pulse signal to an electrode at approximately the underwater location, effecting transmission of the first electrical pulse signal to another electrode at approximately the remote location using the water as the signal-conducting medium, receiving such transmitted signal at approximately the remote location, using the received signal to generate a second electrical pulse signal in the form of a series of direct current pulses having a pulse repetition frequency indicating the numerical value, and actuating mechanism responsive to the second electrical pulse signal to display the numerical value at the remote location.

19. The process defined in claim 18, including averaging the second electrical pulse signal to generate a third electrical signal indicating the numerical value, and actuating mechanism responsive to the third electrical signal to display the numerical value at the remote location.

20. The process defined in claim 18, the second electrical signal being a series of substantially uniform direct current pulses of approximately the same amplitude and duration.

21. The process defined in claim 18, the first electrical pulse signal being a series of direct current pulses.

22. The mechanism defined in claim 18, in which the second electrical signal is a series of substantially uniform direct current pulses of approximately the same amplitude and duration.

23. Mechanism for indicating at a remote location a numerical value representing a condition existing at an underwater location comprising:
a transmitter unit disposable underwater and having means for sensing the condition at the underwater location, means for generating a first electrical pulse signal having a pulse repetition frequency substantially proportional to the numerical value representing the condition sensed by said sensing means and means for effecting transmission of said first electrical pulse signal to the remote location using the water as the signal-conducting medium including a first electrode positioned at approximately the remote location;
a receiver unit disposable at approximately the remote location and having means for receiving said first electrical pulse signal including a second electrode disposable at approximately the remote location, means responsive to such received signal for generating a second electrical pulse signal in the form of a series of direct current pulses having a pulse repetition frequency indicating the numerical value and display means responsive to said second electrical pulse signal for displaying the numerical value at the remote location.

24. The mechanism defined in claim 23, in which the display means includes means for averaging the second electrical signal to generate a third electrical signal indicating the numerical value and means responsive to said third electrical signal for displaying the numerical value at the remote location.

25. The mechanism defined in claim 23, in which the first electrical pulse signal is a series of direct current pulses.

* * * * *